(12) United States Patent
Liao et al.

(10) Patent No.: US 6,617,826 B2
(45) Date of Patent: Sep. 9, 2003

(54) CHARGING DEVICE CAPABLE OF DYNAMICALLY ADJUSTING CHARGING POWER

(75) Inventors: Yu-Shin Liao, Taipei (TW); Wen-Chun Shen, Taipei (TW)

(73) Assignee: Quanta Computer, Inc. (TW)

(*) Notice: Subject to any disclaimer, the term of this patent is extended or adjusted under 35 U.S.C. 154(b) by 0 days.

(21) Appl. No.: 10/017,037

(22) Filed: Dec. 14, 2001

(65) Prior Publication Data
US 2002/0191421 A1 Dec. 19, 2002

(30) Foreign Application Priority Data
Jun. 14, 2001 (TW) ........................................ 90114489 A

(51) Int. Cl.[7] ............................ H02J 7/00; H02M 3/335
(52) U.S. Cl. ............................................ 320/118; 363/20
(58) Field of Search ............................... 363/20, 37, 21.01; 322/222, 282, 283; 320/118, 127, 137, 164, 120

(56) References Cited

U.S. PATENT DOCUMENTS 5,986,437 A * 11/1999 Lee ............................. 320/162
6,288,522 B1 * 9/2001 Odaohhara et al. ......... 320/138

* cited by examiner

Primary Examiner—Rajnikant B. Patel
(74) Attorney, Agent, or Firm—Perkins Coie LLP

(57) ABSTRACT

A charging device capable of dynamically adjusting a charging power. The charging device has elements as follows. A DC-DC converter power stage is used for supplying a charging current to the rechargeable battery. A current error amplifier is used for setting a charging current adjustment signal, being fed to the DC-DC converter power stage for adjusting the charging current. A first current detecting device is used for setting the charging current signal being fed to the current error amplifier. Meanwhile, the charging current is outputted to the rechargeable battery to charge the rechargeable battery. A current detecting/comparating device is used for feedback and outputting the charge current operation signal based upon the work current and a calculated charge current signal. The charging device dynamically adjusts the charging power to increase the utility of the output power of the external power source and reduce the charging time.

6 Claims, 5 Drawing Sheets

CHARGING DEVICE CAPABLE OF DYNAMICALLY ADJUSTING CHARGING POWER

CROSS-REFERENCE TO RELATED APPLICATION

This application claims the priority benefit of Taiwan application serial no. 90114489, filed Jun. 14, 2001.

BACKGROUND OF THE INVENTION

1. Field of the Invention

This invention relates in general to a charging device, and more specifically relates to a charging device suitable for a rechargeable battery of a portable device.

2. Description of Related Art

Digital electronic products have brought more convenient life for human beings as they have been highly developed. Furthermore, high developments of a variety of portable digital devices, such as a mobile phone, a notebook computer (notebook) or a personal digital assistance (PDA), considerably increase convenient life and work efficiency for human beings. As for the notebook, due to its portability, the power supplied to the notebook depends on a special battery installed therein. Therefore, it is very important that the power of the battery is continuously and stably supplied to the notebook for maintaining normal operations of the notebook. Accordingly, charging ability and charging time are important criteria for evaluating a notebook.

FIG. 1 shows a block diagram for a system block 100 of a conventional notebook. As shown, The conventional system block 100 is coupled to an external power source 102, and the system block 100 comprises a charging device 103 and a main function device 104. The charging device 103 utilizes the external power source 102 to charge a rechargeable battery 106. The charging device 103 comprises a current detecting device 108 for detecting a charging current fed into the rechargeable battery and then outputting a charging current signal according to the detected charging current. FIG. 2 shows a block diagram of the current detecting device 108. The current detecting device 108 consists of a current detecting resistor 202 and a current to voltage convert circuit 204, which connection is as shown in FIG. 2. When the charging device 103 begins to charge rechargeable battery 106, the charging current flows through the current detecting resistor 202 and a voltage drop occurs over the current detecting resistor 202. As the charging current becomes larger, the voltage drop increases, too. Therefore, by means of the current detecting resistor 202, the current to voltage convert circuit 204 is able to detect the charging current and then outputs a proper voltage according to the detected charging current. The outputted voltage is defined as the charging current signal, representing the magnitude of the charging current.

Referring to FIG. 1 again, the charging current signal from the current detecting device 108 is fed to a current error amplifier 110. The current error amplifier 110 is coupled to the current detecting device 108 for receiving the charging current signal from the current detecting device 108 and a predetermined charging current signal Cs of the charging device. The current error amplifier 110 compares the detected and predetermined charging current signals for setting and adjusting the charging state of the charging device 103. A DC-DC converter power stage 112 is coupled to the current error amplifier 110 for adjusting the charging current inputted to the current detecting device 108 according to a charging current adjustment signal, thereby the charging state of the charging device 103 can be adjusted. Additionally, the voltage of the rechargeable battery 106 is also feedback to a voltage error amplifier 114. The voltage error amplifier 114 receives a charging voltage signal of the rechargeable battery 106 and a predetermined charging voltage signal Vs of the charging device 103, and then accordingly generates a charging voltage adjustment signal to the DC-DC converter power stage 112. The DC-DC converter power stage 112 receives the charging current adjustment signal from the current error amplifier 110 and the voltage adjustment signal from the voltage error amplifier 114 to adjust the charging power. In other words, the charging device 103 can adjust and determine the charging condition during charging the rechargeable battery 106 according to the charging current inputted to the rechargeable battery 106 and the charging voltage of the rechargeable battery 106 itself.

FIGS. 3A–3C show timing diagrams that the charging voltage and the charging current are varied with time when the charging device 103 charges the rechargeable battery with a full rated current. Assuming an initial charging voltage Vi of the rechargeable battery 106, the initial charging voltage Vi is smaller than a full rated voltage Vf of the rechargeable battery 106. The charging device 103 determines the full rated voltage Vf of the rechargeable battery 106 according to the predetermined charging voltage signal previously inputted to the voltage error amplifier 114. When the charging process begins, both of the charging current adjustment signal from the current error amplifier 110 and the charging voltage adjustment signal from the voltage error amplifier 114 are inputted to the DC-DC converter power stage 112, in which both adjustment signals are represented by their voltages. Because the voltage Vi of the recharging battery 106 is smaller than its full rated voltage Vf, the charging voltage adjustment signal outputted from the voltage error amplifier 114 is smaller than the charging current adjustment signal outputted from the current error amplifier 110. Accordingly, the DC-DC converter power stage 112 adjusts the charging state based upon the received charging current adjustment signal, and then the charging device 103 charges the rechargeable battery 106 with a full rated current Is. The full rated current Is is determined by the charging device 103 according to a predetermined charging current signal previously inputted to the current error amplifier 110. For example, as shown in FIG. 3A, the full rated current Is3 is inputted to the rechargeable battery 106.

Referring to FIG. 3A, as the charging time increases, the voltage of the rechargeable battery 106 increases. The voltage level of the charging voltage adjustment signal increases as the voltage of the rechargeable battery 106 increases, but is still smaller than the voltage level of the charging current adjustment signal outputted from the current error amplifier 110. Therefore, the DC-DC converter power stage 112 adjusts the charging state according to the received charging current adjustment signal such that the charging current is maintained at the fall rated current Is3 preset by the charging device 103.

For example, as shown in FIG. 3A, when the charging process proceeds to time t3, the charging voltage of the rechargeable battery 106 is equal to the predetermined full rated voltage Vf of the rechargeable battery 106. Thereafter, the voltage level of the charging voltage adjustment signal outputted from the voltage error amplifier 114 is larger than the voltage level of the charging current adjustment signal outputted from the current error amplifier 110. The DC-DC converter power stage 112 adjusts the charging state according to the received charging voltage adjustment signal. Then, the charging current for the rechargeable battery 106 decreases as the time increases. Furthermore, the voltage of the rechargeable battery is maintained at the full rated voltage Vf.

As the foregoing description, the full rated current Is inputted to the rechargeable battery 106 is previously determined by the charging device 103. And the value of the full rated current Is determines the charging efficiency, i.e., how much time the charging process spends. FIG. 3B shows a diagram that the charging voltage of the rechargeable battery 106 increases with time during the charging process when the full rated current inputted to the rechargeable battery 106 is Is2. Referring to FIGS. 3B and 3C, because the full rated current Is2 is larger than the full rated current Is1, the charging time t2 using the full rated current Is2 is less than the charging time t1 using the full rated current Is1. Similarly, referring to FIGS. 3A, 3B and 3C, when the rechargeable battery 106 is charged by a full rated current Is3 larger than the full rated current Is1 or Is2, the charging time t3 is less than the charging time t1 using the full rated current Is1 or the charging time t2 using the full rated current Is2. In other words, when the predetermined full rated current Is is larger, its charging efficiency is better. Namely, the charging process spends less time.

As the foregoing description, the charging device 103 determines the full rated current Is and the full rated voltage Vf for charging the battery by previously setting the charging current signal and the charging voltage signal. Therefore, during the charging process, both the full rated current Is and the full rated voltage Vf are preset and as constant, which means that the maximum power reserved for charger is a constant when the charging device 103 charges the battery 106. But not totally utilized.

The external power source 102 also supplies a portion of its output power to the main function device 104 of the notebook when the charging device 103 charges the rechargeable battery 106. Referring to FIG. 1, a power source mix circuit 116 is coupled to the external power source 102 and the rechargeable battery 106 for providing power to the main function device 104 of the notebook to maintain its normal function.

The charging device is coupled to the external power source. The external power source also provides power (the work power) for the operation of main function device of the notebook in addition to providing power (the charging power) to the charging device. The power provided by the external power source is constant and must be properly distributed for maintaining the normal function of the main function device and effectively charging the rechargeable battery. The charging device determines the full rated current and the full rated voltage for charging by previously setting the charging current and the charging voltage. In other words, the charging power distributed and reserved for the charging device to charge the battery is constant. However, the power consumed by the main function device during its operation is changed with its tasks, rather than a constant. Accordingly, it has to properly set the full rated current and full rated voltage of the charging device for preventing the total of the charging power and the work power from exceeding the output power of the external power, i.e., to prevent overloading. Conventionally, the charging power of the charging device is set according to the maximum work power of the main function device of the notebook during its operation. Namely, the maximum charging power is set by subtracting the maximum work power of the main function device from the output power of the external power source. Accordingly, even though the notebook is operated with its maximum work power, the external power source is not overloaded.

However, there are some problems happened to the conventional charging device. The maximum charging power of the charging device is set according to the maximum work power of the main function device of the notebook during its operation. FIG. 4 is a timing diagram for illustrating the uneffective power, the work power of the main function device and the charging power of the charging device distributed from the output power of the external power source, wherein the horizontal axis represents time and the vertical axis represents percentages of charging power of the charging device and the work power of the main function device with respect to the output power of the external power source, assuming that the output power of the external power source is 100%. It should be noticed that the output power of the external power source is not completely provided to the main function device or the charging device, and a small portion of the output power is unused. Furthermore, the notebook is not always operated with its maximum work power and the charging device is not always charging a rechargeable battery with maximum charging power. Therefore, the sum of the work power of the main function device and the charging power of the charging device is smaller than the total output power of the external power source. A portion of the output power, the shadow portion in FIG. 4, of the external power source is not efficiently used. The shadow portion is wasted and termed as the uneffective power. In other words, the usable output power of the external power source is not completely utilized. Therefore, it requires a longer time to charge the rechargeable battery and the charging efficiency is not good.

According to the discussion setout, the conventional charging device encounters problems that the output power is not completely utilized, charging time is long and the charging efficiency is bad.

SUMMARY OF THE INVENTION

According to the foregoing description, an object of this invention is to provide a charging device capable of dynamically adjusting a charging power, for increasing the utility of the output power of the external power source, reducing the charging time and increasing the charging efficiency.

According to the object mentioned above, the invention provides a charging device capable of dynamically adjusting a charging power.

The charging device is within a system block of a portable system. The system block consists of the charging device and a main function device, and an external power source is coupled to the system block for supplying a work current to the main function device and for charging a rechargeable battery in the charging device. The charging device comprises elements as follows. A DC-DC converter power stage is coupled to the external power source for supplying a charging current to the rechargeable battery. A current error amplifier is coupled to the DC-DC converter power stage for setting a charging current adjustment signal according,.to a charging current signal and a work current operation signal, and the charging current adjustment signal is fed to the DC-DC converter power stage for adjusting the charging current. A first current detecting device is coupled to the DC-DC converter power stage, current error amplifier and the rechargeable battery for outputting the charging current signal to the current error amplifier based upon the charging current. Additionally, the charging current is fed to the rechargeable battery to charge the rechargeable battery. And, a current detecting/comparating device is coupled to the external power source and the current error amplifier for outputting the work current signal to the current error amplifier by means of comparing and operating the work current and a work current setting signal.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

The invention provides a charging device capable of dynamically adjusting a charging power within a system block of a portable system. The charging power of the charging device can be adjusted dynamically according to a work power of a notebook computer even though the output power of an external power source is constant. Therefore, the output power of the external power source can be effectively utilized, and in addition time for charging a rechargeable battery can be reduced for increasing the charging efficiency.

Figure 1:
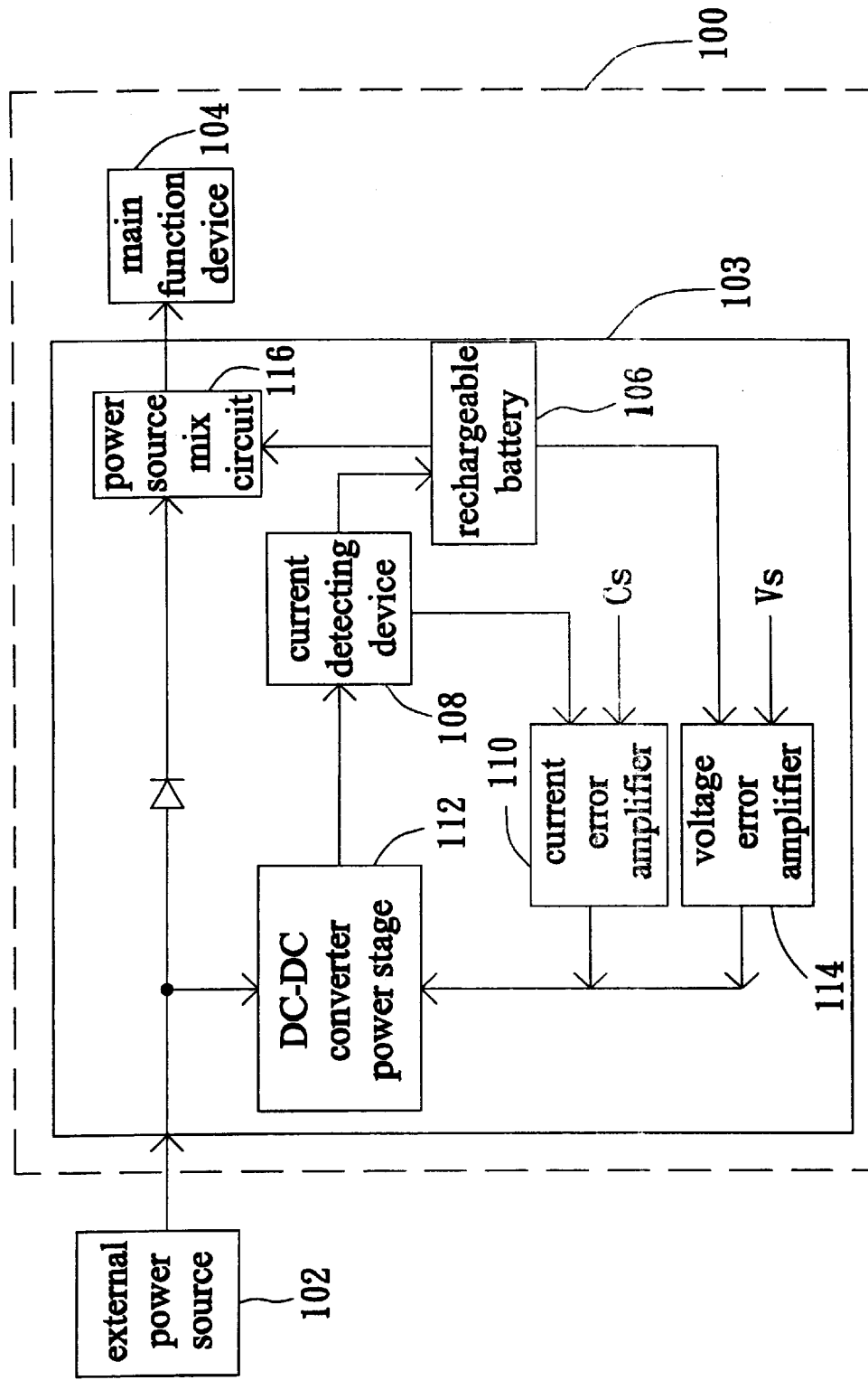
FIG. 1 shows a block diagram for a system block 100 of a conventional notebook.
Figure 5:
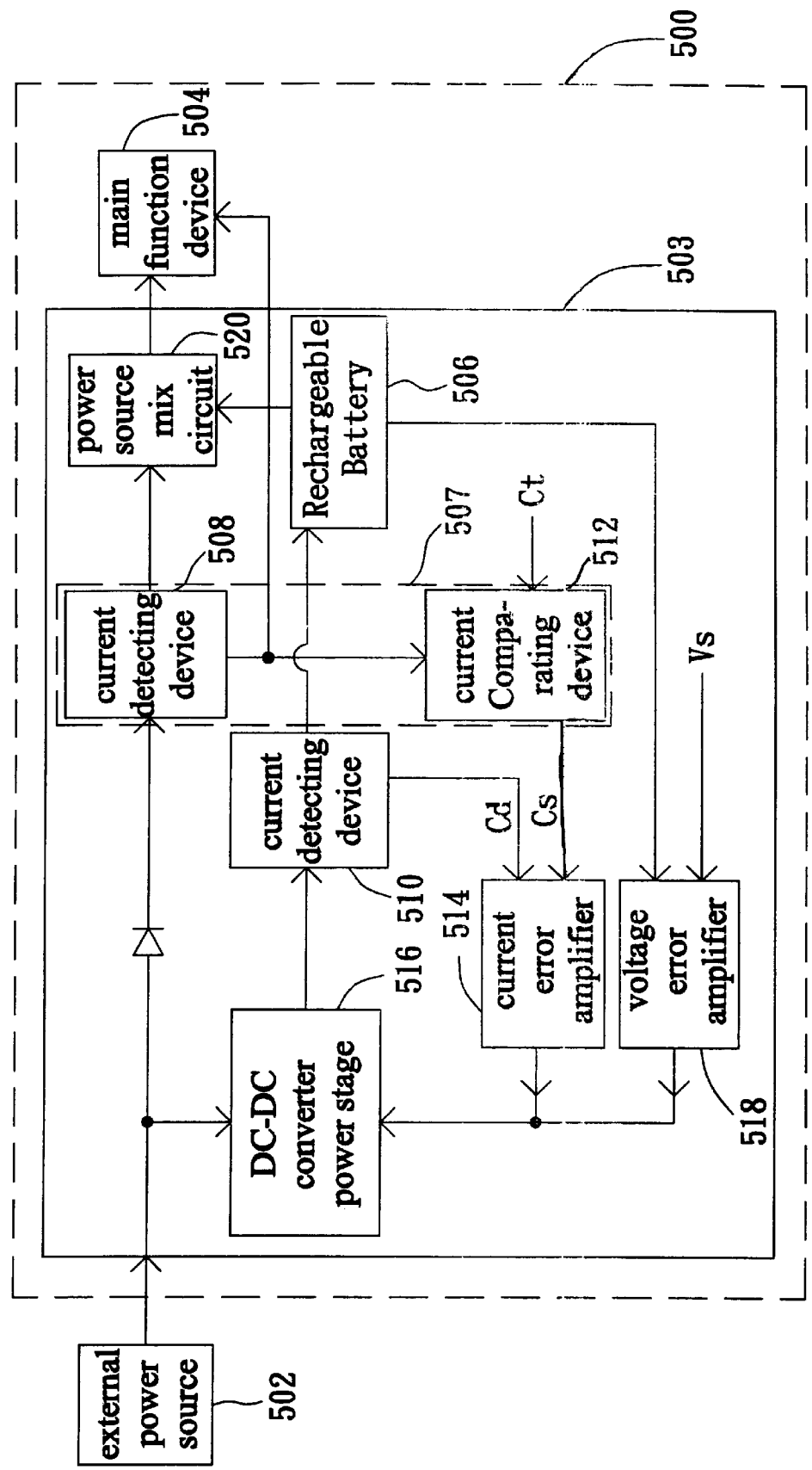
FIG. 5 is a block diagram of a system block of the charging device capable of dynamically adjusting a charging power according to the invention.

FIG. 5 is a block diagram of a system block 500 of the charging device capable of dynamically adjusting a charging power according to the invention. The system block 500 is coupled to an external power source 502 and consists of a charging device 503 and a main function device 504. The charging device 503 uses the power provided by the external power source 502 to charge the rechargeable battery 506. Referring to FIGS. 1 and 5, the difference between the invention and the conventional one is that a current detecting/comparating device 507 is assembled in the charging device 503. The current detecting/comparating device 507 comprises a current detecting device 508 and a current comparating device 512. In addition, the charging device 503 comprises current detecting device 508 and 510.

Figure 2:
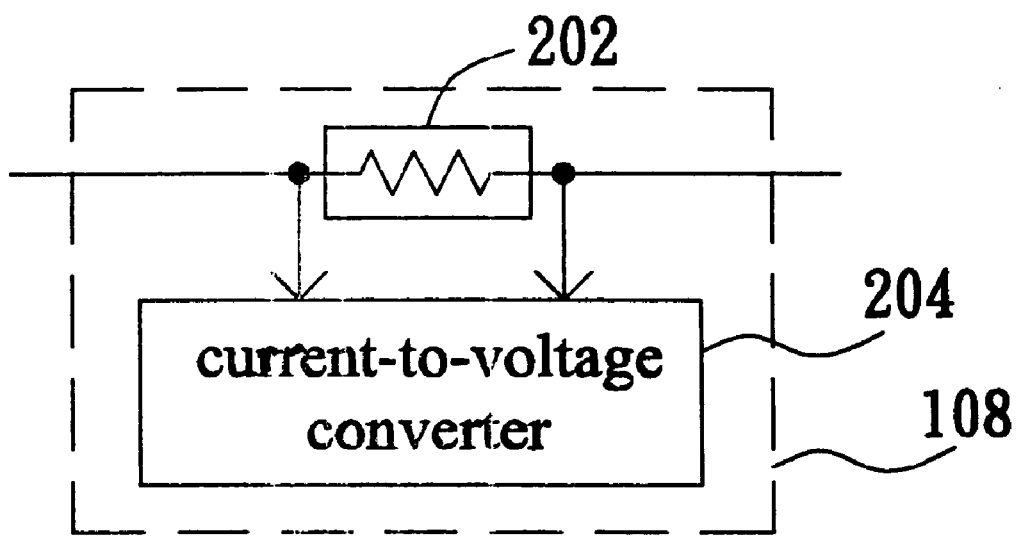
FIG. 2 shows a circuit diagram of the current detecting device of the conventional charging device in FIG. 1.
Figure 3A:
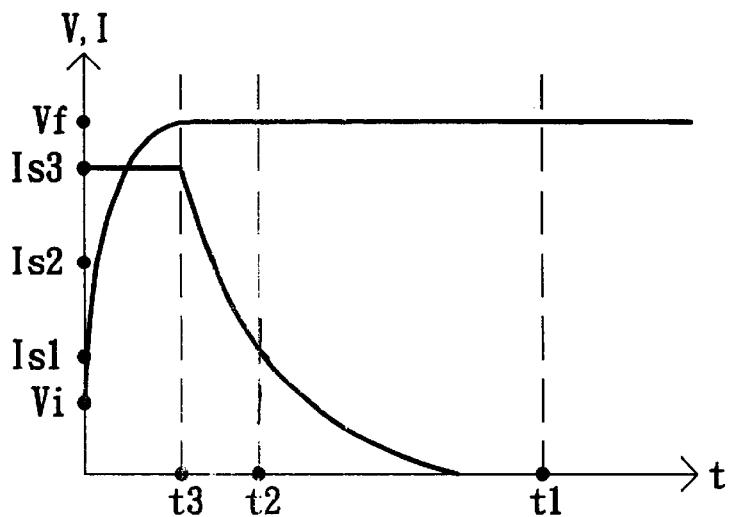
FIG. 3A is a timing diagram showing the charging voltage and the charging current vary with time when the full rated current of the charging device is set to Is3 to charge the battery.
Figure 3B:
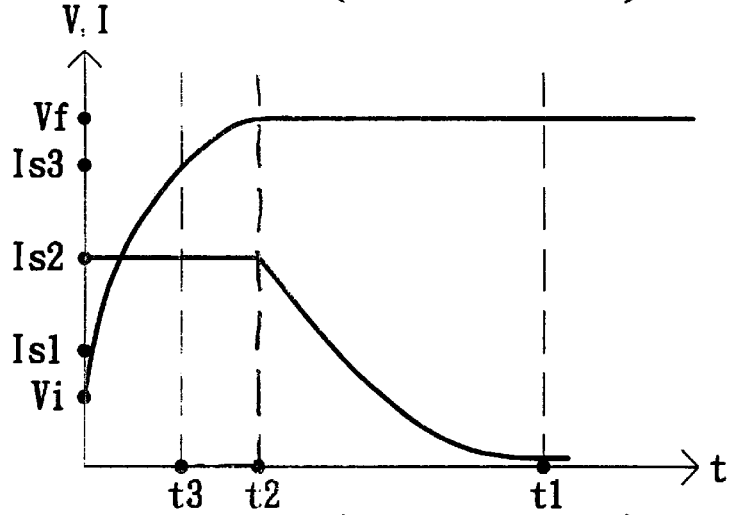
FIG. 3B is a timing diagram showing the charging voltage and the charging current vary with time when the full rated current of the charging device is set to Is2 to charge the battery.
Figure 3C:
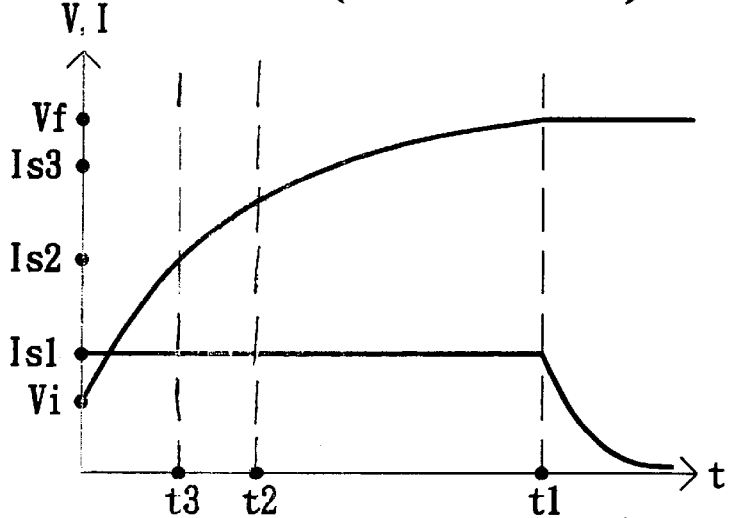
FIG. 3C is a timing diagram showing the charging voltage and the charging current vary with time when the full rated current of the charging device is set to Is1 to charge the battery.
Figure 4:
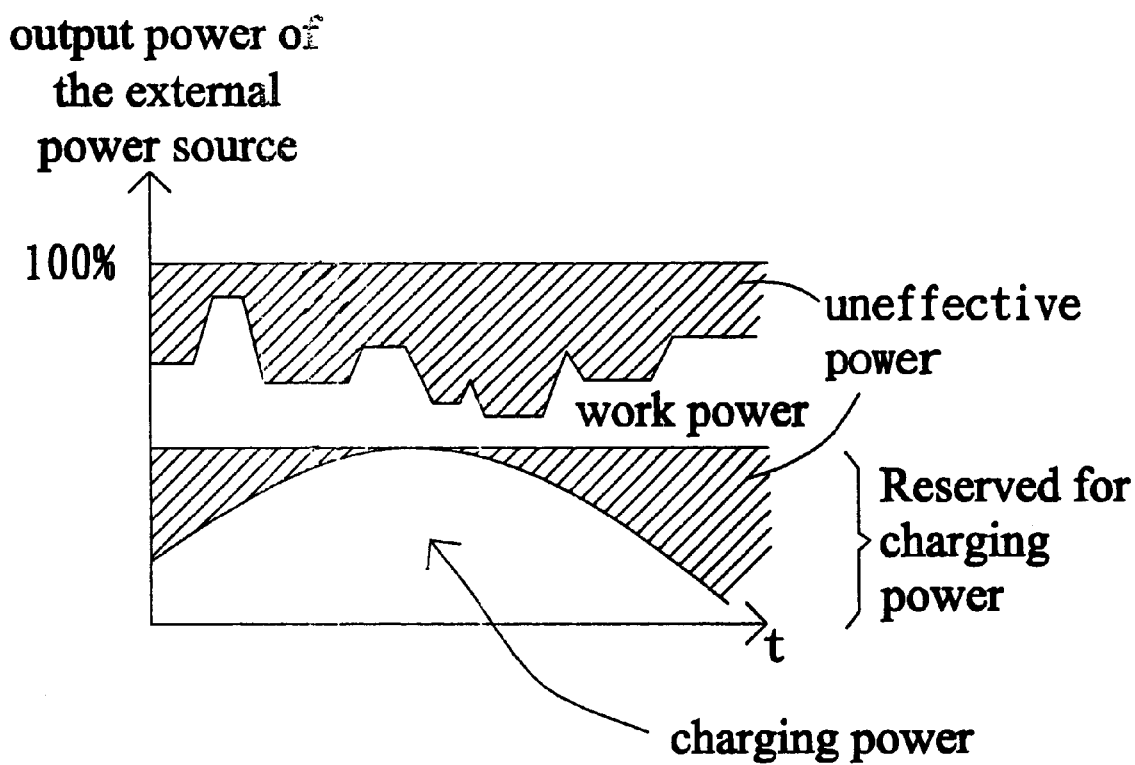
FIG. 4 is a timing diagram for illustrating the uneffective power, the work power of the main function device and the charging power of the charging device distributed from the output power of the external power source.

The current detecting device 508 is coupled to the external power source 502, providing a work current to the current detecting device 508. The work current is then inputted to the main function device 504 of the notebook for maintaining the main function device 504 works normally. The operations of the elements of the current detecting device 508 are the same as the current detecting device 108 of the conventional charging device 103 in FIG. 2. The current detecting device 508 is used for detecting the value of the work current, i.e. the work power, inputted to the main function device 504 of the notebook, and then outputting a work current signal according to the detected value of the work current.

The current comparating device 512 is coupled to the current detecting device 508, in which the work current signal outputted from the current detecting device 508 is inputted to the current comparating device 512. The current comparating device 512 respectively receives the work current signal from the current detecting device 508 and a calculated charge current signal Ct of the charging device 503. As the foregoing description, the work power of the main function device 504 varies with its work states, and the work current and the work current signal detected by the current detecting device 508 are varied accordingly. The current comparating device 512 compares and operates the work current signal with the calculated charge current signal Ct for obtaining the charge current operation signal $C_s$ of charge device 503. Then, the current comparating device 512 outputs a charge current operation signal Cs to a current error amplifier 514 according to the work current signal and the calculated charge current signal Ct.

The current error amplifier 514 is coupled to the current comparating device 512 for outputting. The current error amplifier 514 receives a charging current signal from the current detecting device 510 in addition to the charge current operation signal $C_s$ from the current comparating device 512. The operations of the elements of the current detecting device 510 are the same as the current detecting device 108 of the conventional charging device 103, and used for detecting the value of the charging current flowing through the current detecting device 510, which detail operations are omitted for simplicity. The charging current signal outputted from the current detecting device 510 represents the charging power of the charging device 503, and the charge current operation signal $C_s$ outputted from the current comparating device 512 represents the charge current setting of the charge device 503 of the notebook. The current error amplifier 514 is used for determining the charging power when the charging device 503 performs a charging process under the work power of the main function device 504. Under the condition that the output power of the external power source 502 is constant, the current error amplifier 514 is capable of dynamically determining the charging power of the charging device 503 according to the work power of the main function device 504. According to the foregoing discussion, under the condition that the output power of the external power source 502 is constant, if the work power of the main function device 504 can be detected time after time and the charging device 503 can dynamically adjust the charging power for the rechargeable battery 506, then the charging device 503 can adjust the charging power for the rechargeable battery 506 according to the various work power of the main function device 504. In order to effectively utilize the output power of the external power source 502 and minimize the power waste, the charging device 503 can set the charging power for the rechargeable battery 506 to a power difference between the usable output power of the external power source 502 and the work power of the main function device 504. Therefore, the output power of the external power source 502 can be almost completely used, without causing power loss of portion of the output power of the external power source when the work power of the main function device 504 is reduced and the charging power of the charging device 503 is constant.

The current error amplifier 514 compares the charging current signal and charge current operation signal and then outputs a charging current adjustment signal to a DC-DC converter power stage 516 for adjusting the value of the charging current.

The DC-DC converter power stage 516 is coupled to the external power source 502, and receives the charging current adjustment signal from the current error amplifier 514 and the charging voltage adjustment signal from the voltage error amplifier 518. The DC-DC converter power stage 516 can adjust the value of its outputted charging current according to the charging current adjustment signal or the charging voltage adjustment signal. The charging current outputted from the DC-DC converter power stage 516 charges the rechargeable battery 506 through the current detecting device 510. Except the output power of the external power source 502 for the main function device 504, the remained output power of the external power source 502 can be used as the charging power for the rechargeable battery 506. Therefore, the charging current of the invention is larger than the conventional charging current, thus resulting in a short charging time. It should be noticed that the functions and operations of the voltage error amplifier 518, the DC-DC converter power stage 516 and the power source mix circuit 520 of the invention are the same as the voltage error amplifier 144, the DC-DC converter power stage 112 and the power source mix circuit 116 of the conventional charging device 103, which detail operations are omitted for simplicity.

The current detecting device 508 is further coupled to the main function device 504. When an abnormal work current from the external power source is detected by the current detecting device 508, the current detecting device 508 outputs an alarm signal to the main function device 504 for noticing the main function device that an abnormal current is inputted. Protection circuit can be further installed in the main function device 504 for preventing the abnormal current from flowing into the main function device. Thus, it prevents the main function device 504 from damages that affect its normal functions.

In addition to the notebook disclosed in the embodiment, the charging device 503 of the invention is also suitable for other portable devices, such as the mobile phone or the PDA.

According to the embodiment above, the charging device capable of dynamically adjusting the charging power of the charging device can achieve at least objects as follows.

1. Increasing the utility of the output power of the external power source. The charging device of the invention can dynamically adjust the charging power inputted to the rechargeable battery. Therefore, because the output power of the external power source is constant and the work power of the main function device can be detected at any time, the charging power for the rechargeable battery can be dynamically adjusted according to the detected work power of the main function device. In order to effectively utilize the output power of the external power source and minimize the power waste, the charging device can set the charging power inputted to the rechargeable battery by subtracting the work power of the main function device from the usable output power of the external power source. Therefore, the usable output power of the external power source can be almost completely utilized without losing a portion of the output power of the external power source when the work power of the main function device is reduced and the charging power of the charging device is constant.

2. Reducing the charging time and increasing the charging efficiency. The charging device of the invention can dynamically adjust the charging power of the charging device. Under the condition that the output power of the external power source is constant, the charging power can be dynamically adjusted according to the work power of the main function device, causing that the output power of the external power source can be effectively utilized without waste. Except the output power of the external power source for the main function device 504, the remained output power is used as the charging power for the rechargeable battery. Therefore, the charging current of the invention is larger than the conventional charging current, thus resulting in a short charging time and better charging efficiency.

3. Avoiding abnormal work current to the main function device. The current detecting/comparating device is coupled to the main function device of the charging device. When an abnormal work current from the external power source is detected by the current detecting/comparating device, the current detecting/comparating device outputs an alarm signal to the main function device for noticing the main function device that an abnormal current is inputted. Protection circuit can be further installed in the main function device for preventing the abnormal current from flowing into the main function device. Thus, it prevents the main function device from damages affecting its normal functions.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A charging device capable of dynamically adjusting a charging power within a system block of a portable system, wherein the system block consists of the charging device and a main function device, and an external power source is coupled to the system block for supplying a work current to the main function device and for charging a rechargeable battery in the charging device, the charging device comprising:

a DC-DC converter power stage coupled to the external power source for supplying a charging current to the rechargeable battery;

a current error amplifier, coupled to the DC-DC converter power stage for setting a charging current adjustment signal according to a charging current signal and a charge current operation signal, and the charging current adjustment signal being fed to the DC-DC converter power stage for adjusting the charging current;

a first current detecting device, coupled to the DC-DC converter power stage, current error amplifier and the rechargeable battery, for outputting the charging current signal based upon the charging current, and the charging current being fed to the rechargeable battery to charge the rechargeable battery; and a current detecting/comparating device, coupled to the external power source and the current error amplifier, for outputting the charge current operation signal based upon the work current and a calculated charge current signal.

2. The charging device of claim 1, wherein the current detecting/comparating device further comprises:

a second current detecting device, coupled to the external power source, for outputting a work current signal according to the work current to detect the work current inputted to the portable device; and a current comparating device, coupled to the second current detecting device, for setting and then outputting the charge current operation signal according to the work current signal and the calculated charge current signal.

3. The charging device of claim 1, wherein the current detecting/comparating device is further coupled to the main function device, when the current detecting/comparating device detects an abnormal work current, the current detecting/comparating device outputs an alarm signal to the main function device of the portable system for informing the main function device that the abnormal work current is inputted.

4. The charging device of claim 1, wherein the portable system is a notebook computer.

5. The charging device of claim 1, wherein the portable system is a mobile phone.

6. The charging device of claim 1, wherein the portable system is a personal digital assistant (PDA).

* * * * *